United States Patent

Hasebe et al.

[15] 3,693,180
[45] Sept. 19, 1972

[54] INTERMITTENT RECORDERS

[72] Inventors: Takefumi Hasebe; Kazuo Yamada, both of Tokyo, Japan

[73] Assignee: Yokogawa Electric Works, Ltd., Musashino City, Tokyo, Japan

[22] Filed: Aug. 26, 1970

[21] Appl. No.: 67,002

[30] Foreign Application Priority Data

April 1, 1970 Japan ..................45/31215

[52] U.S. Cl. .......................346/17, 346/46, 346/141
[51] Int. Cl. .................................................G01d 9/34
[58] Field of Search ....346/17, 34, 46, 141; 340/266; 200/56

[56] References Cited

UNITED STATES PATENTS

| 2,425,080 | 8/1947 | Blakeslee | 346/34 X |
| 2,903,321 | 9/1959 | Maude | 346/17 |
| 2,993,741 | 7/1961 | Maltby et al. | 346/34 |

*Primary Examiner*—Joseph W. Hartary
*Attorney*—Chittick, Pfund, Birch, Samuels & Gauthier

[57] ABSTRACT

In an intermittent recorder for recording a plurality of measured quantities by dots of different colors, there is provided an ink holder containing a plurality of pens supplied with inks of different colors and a Geneva gear mechanism for intermittently transferring the pens in accordance with the type of measured quantities. There is also provided an alarm point set mechanism for setting a predetermined limit of deflection of the pointer arm of the recorder.

7 Claims, 14 Drawing Figures

FIG. 1

INVENTORS
TAKEFUMI HASEBE
KAZUO YAMADA

FIG. 7a  BALANCING CONDITION

FIG. 7b  RECORDING CONDITION

FIG. 7c  TRASFER CONDITION

INTERMITTENT RECORDERS

BACKGROUND OF THE INVENTION

This invention relates to a recorder and more particularly to an intermittent recorder wherein a plurality of measured quantities are recorded on the same recording medium by dots of different colors.

SUMMARY OF THE INVENTION

It is an object of this invention to provide a novel intermittent recording mechanism for the recorder of the type referred to above.

Another object of this invention is to provide an intermittent recorder having an alarm mechanism of compact and small size.

According to this invention there is provided driving means responsive to a measured quantity, a rotary arm driven by said driving means in accordance with said measured quantity, an intermittent recording mechanism mounted on one end of said arm, a shaft extending along said arm to drive said intermittent recording mechanism and means to rotate intermittently said shaft, said intermittent recording mechanism comprising a supporting frame fixed to said one end of said arm, a shaft mounted on said supporting frame, a swinging frame rotatably mounted on said frame, a plurality of recording pens mounted on said swinging frame, means to transmit the rotation of said shaft to said recording pens and to transfer said pens at each one revolution of said shaft, means to reciprocate said swinging frame at each revolution of said shaft, an ink container mounted on said supporting frame and containing inks of different colors and means to transfer operating pens of different colors at each revolution of said shaft.

According to another aspect of this invention there is provided an alarm point set mechanism comprising an alarm point set lever having a rotary shaft coaxial with the rotary shaft of said arm, a movable plate secured to said alarm point set lever, a switch element mounted on the movable plate, switch operating means including a cam rotatably mounted on said movable plate and means for rotating said cam according to the deflection of said arm.

DESCRIPTION OF THE PREFERRED EMBODIMENTS

Figure 1:
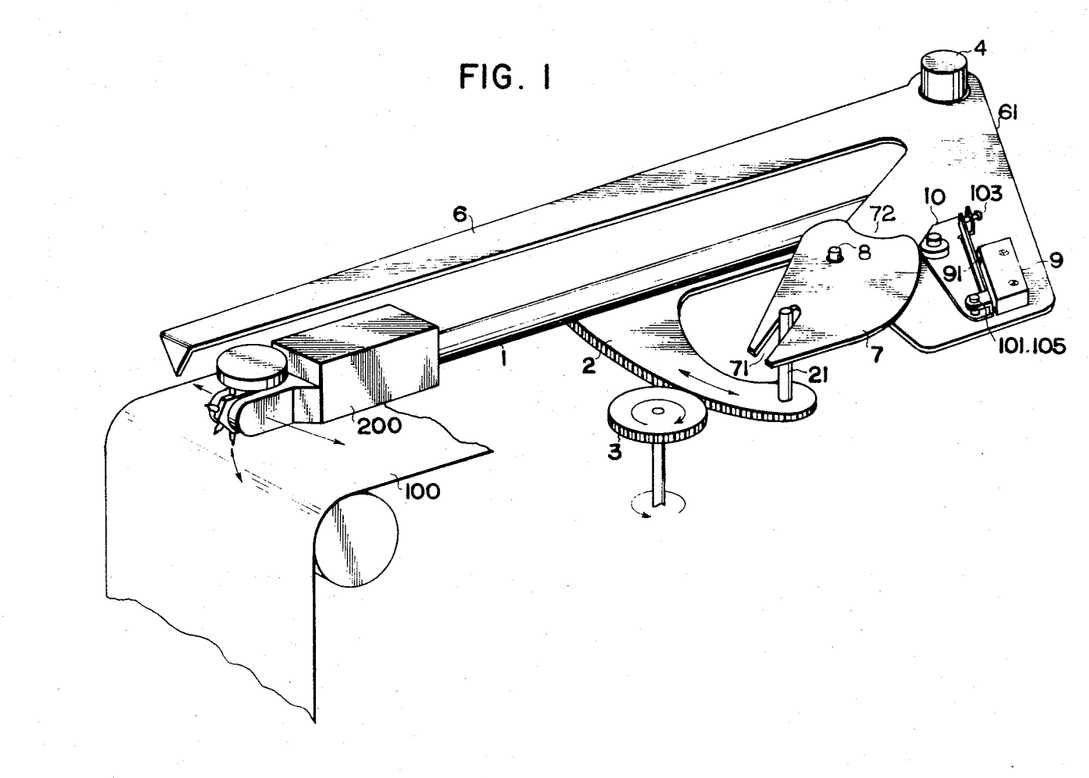
FIG. 1 is a perspective view of the essential component parts of the intermittent recorder embodying this invention.
Figure 2:
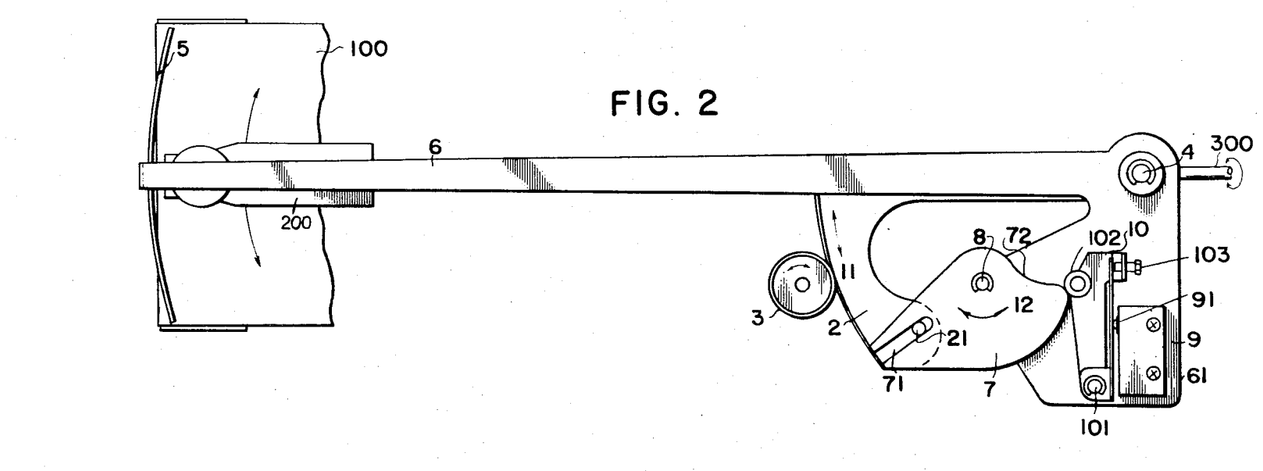
FIG. 2 is a plan view of the recorder shown in FIG. 1.
Figure 3:
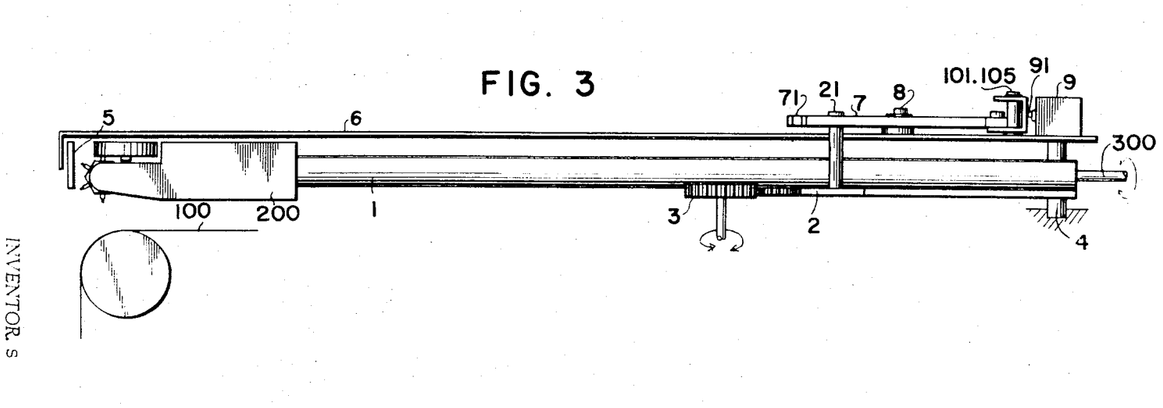
FIG. 3 shows a side elevation of the recorder shown in FIG. 1 and 2.

With reference first to FIGS. 1, 2 and 3 there is shown a preferred embodiment of the novel recorder comprising a deflectable hollow arm pivoted at a pivot shaft 4. Arm 1 corresponds to a pointer of a conventional electric meter cooperating with a scale 5 and a recording paper 100. An intermittent recording mechanism 200 is mounted on the outer end of arm 1 and is driven by a shaft 300 extending through arm 1 to perform the intermittent recording operation to be described later. A driven gear 2 is mounted beneath the arm 1 to be driven by a drive gear 3 according to the measured value. It is to be understood that drive gear 3 is mounted on the shaft of an automatically balancing electric motor not shown. A pin 21 is secured on the driven gear 2, the pin which is adapted to engage a notch 71 of a plate cam 7 of the alarm mechanism to be described later.

As shown in FIGS. 1 to 3, the alarm mechanism comprises a lever 6 for setting an alarming value. Lever 6 is formed integral with a movable plate 61 which is freely mounted on the stationary shaft 4. A plate cam 7 is freely mounted on a shaft 8 secured to movable plate 61. Plate cam 7 is provided with a notch or slot 71 and a low portion 72 at a predetermined spacing from slot 71. A microswitch 9 is secured on the movable plate 61. Microswitch 9 has an operating member 91 operated by a lever 10 which in turn is freely supported by a shaft 101 secured to movable plate 61. A roller 102 is mounted on the operating lever 10 and is normally urged against the periphery of plate cam 7 by means of a spiral spring 105 wound on shaft 101. 103 is an adjusting screw. It will thus be clear that set lever 6, movable plate 61, microswitch 9, operating lever 10 and plate cam 7 constitute the alarm mechanism.

Figure 4:
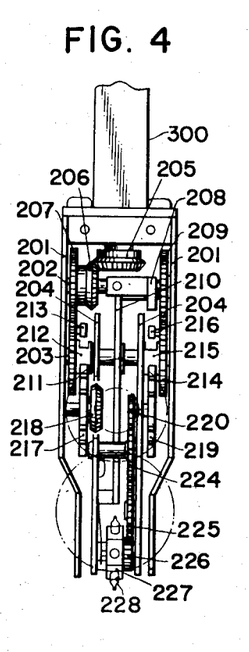
FIG. 4 shows a plan view of an intermittent recording mechanism utilized in this invention.
Figure 5:
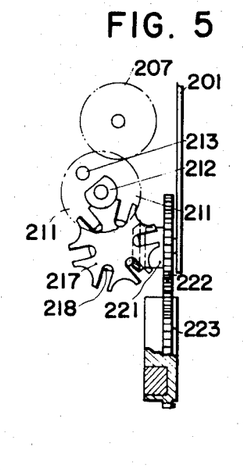
FIG. 5 and 6 show side views of the mechanism shown in FIG. 4 as viewed from opposite sides.
Figure 6:
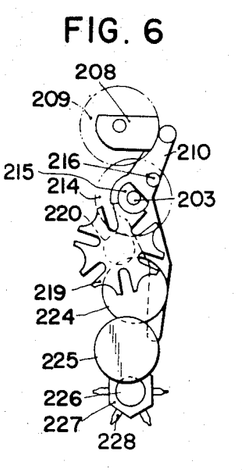

The detail of the intermittent recording mechanism is shown in FIGS. 4 to 6. As shown in these drawings the mechanism comprises a stationary frame 201 which supports a rotatable shaft 202 and a stationary shaft 203 which supports a swinging frame 204. A bevel gear 205 is mounted on a shaft 300 which rotates one complete revolution for each intermittent recording operation effected at a definite interval. Another bevel gear 206 meshing bevel gear 205 is formed integral with a gear 207 and is secured to shaft 202. Shaft 202 also carries a cam 208 and a gear 209, these bevel gear 206, gear 207, cam 208 and gear 209 rotate in unison and make one complete revolution when bevel gear 205 rotates one revolution intermittently. A lever 210 is rotatably mounted on shaft 203 to be driven by cam 208 to oscillate swinging frame 204 so as to perform the intermittent recording operation as will be described later in detail. A gear 211 is freely mounted on shaft 203 to mesh gear 207, gear 211 being provided with a cam 212 and a pin 213 which drives a Geneva gear 217 described later. Gear 214 of similar construction is provided with a cam 215 and pin 216 (which drives another Geneva gear 219) and is freely mounted on shaft 203. Gear 214 is driven by gear 209. Gears 211 and 214 are constructed to make one complete revolution as the gears 207 and 209 make one complete revolution, respectively. The Geneva gear 217 rotatably mounted on frame 201 has a bevel gear 218 integral therewith. The other Geneva gear 219 is rotatably mounted on swinging frame 204 and is provided with a gear 220 coaxial therewith. Geneva gears 217 and 219 are driven respectively by pins 213 and 216 of gears 211 and 214 respectively and are intermittently driven through a definite angle (in this case 60°) by one complete revolution of gears 211 and 214, respectively. As shown in FIGS. 5, 6, 7a, 7b and 7c, each Geneva gear has six equally spaced inwardly extending radial slots which are adapted to be sequentially engaged by pins 213 or 216 to sequentially rotate the Geneva gears through successive 60° increments. The rotation of Geneva gear 217 is transmitted to an ink container 223 through bevel gears 218 and 221 and gear 222 to intermittently rotate the ink container 223 by a definite angle (60°, in this case). The interior of the ink container 223 is divided into compartments of the same number as the number of measuring points (six, in this example), respective compartments containing pieces of felts impregnated with inks of different colors. The rotation of Geneva gear 219 is transmitted to a gear 226 mounted on swinging arm 204 through gears 224 and 225 rotatably mounted on swinging frame 204 to rotate a pen holder 227 integral with gear 226 by a definite angle (60°, in this example). The pen holder 227 is in the form of a hexagon having six pens 228 on it periphery. Since Geneva gear 219, gears 224, 225 and 226 and pen holder 227 are mounted on the swinging frame 204 they oscillate in unison with swinging frame 204 when driven by lever 210 whereby to record one spot as the cam 208 or bevel gear 205 makes one complete revolution.

Figure 7A:
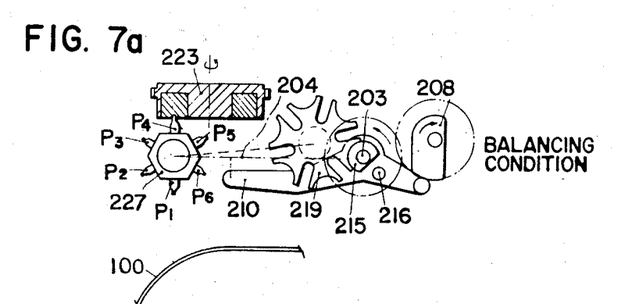
FIGS. 7a, 7b and 7c are side views explaining different operating conditions of the intermittent recording mechanism.
Figure 7B:
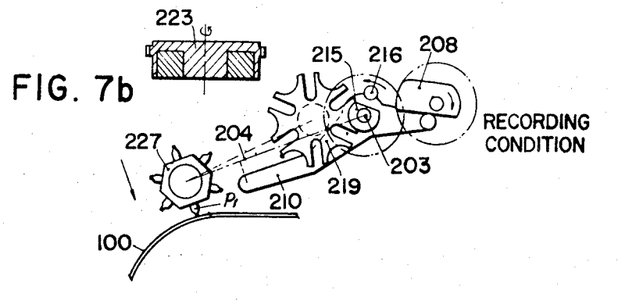
Figure 7C:
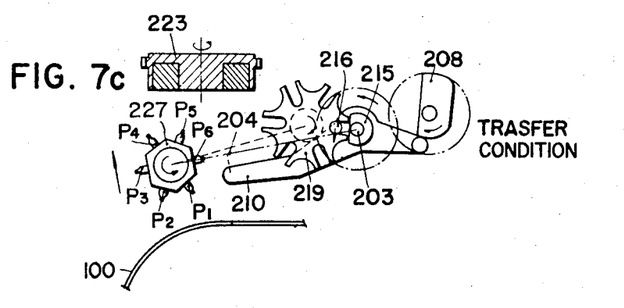

Operation of the intermittent recording mechanism will now be considered with reference to FIGS. 7a, 7b and 7c which show the sequence of recording one dot. FIG. 7a shows a condition before recording wherein the automatic balancing operation is being performed (designated as the balancing condition), FIG. 7b the dot recording condition and FIG. 7c the transfer or switching condition after recording.

Under the balancing condition shown in FIG. 7a cam 208 is held stationary at the position shown and by the action of cam 208 and lever 210 the swinging frame 204 and hence pen holder 227 is held in the highest position remote from the recording paper 100. At this time pen $P_1$, which is now to be used for recording, is facing recording paper 100 while pen $P_4$ diametrically opposite to pen $P_1$ is in contact with ink container 223 to be supplied with ink therefrom. It will be clear that pen $P_1$ has been previously supplied with ink in the same manner. If cam 208 is rotated to the position shown in FIG. 7b from the position just described, the lefthand end of lever 210 is displaced to the lowest position so that swinging frame 204 is also lowered to cause pen $P_1$ of pen holder 227 to strike against recording paper to mark a dot. At this time, since swinging frame 204 rotates about shaft 203 Geneva gear 219 slides along an arcuate surface of cam 215 concentric with shaft 203. For this reason no torque is applied upon Geneva gear 219 at the time of the recording operation thus preventing pen holder 227 from rotating. Upon further rotation of cam 208 to a position shown in FIG. 7c, pen holder 227 is raised away from recording paper 100 by the action of lever 210. At the same time by the rotation of Geneva gear 219 driven by pin 216 pen holder 227 is started to rotate 60° to bring the next pen $P_2$ to the recording position. During this interval ink container 223 is rotated 60° by the gear train shown in FIG. 5 to change the color of ink. Concurrently therewith the measuring point is transferred and upon completion of all transfer operations the mechanism is restored to the condition of FIG. 7a and cam 208 stops rotating. Then a similar balancing operation is performed for a succeeding measuring point. In the same manner, for each intermittent revolution of cam 208 the above described cycle is repeated to sequentially record six measuring points by inks of different colors.

With this intermittent recording mechanism since the center of motion of the swinging arm at the time of the intermittent recording operation coincides with the center of the cam of the Geneva gear for switching the recording pens it is possible to provide a recording mechanism of simple construction which does not impart undue torque to the recording pens at the time of recording operation thus providing a compact and small intermittent recording mechanism.

Figure 8A:
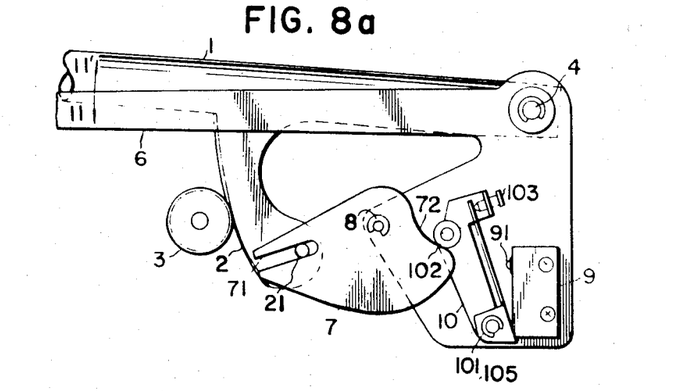
FIGS. 8a, 8b and 8c are plan views to explain different operating conditions of an alarm mechanism utilized in the recorder of this invention.
Figure 8B:
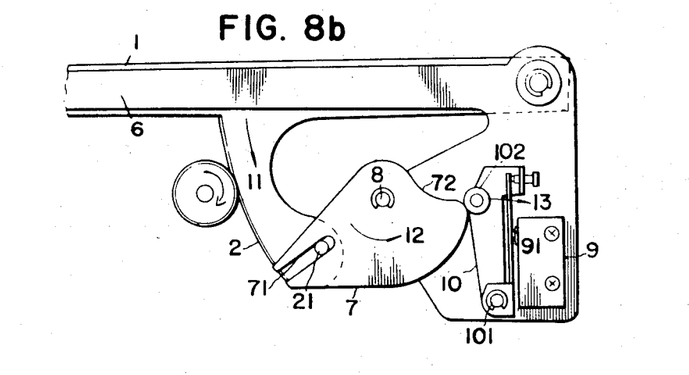
Figure 8C:
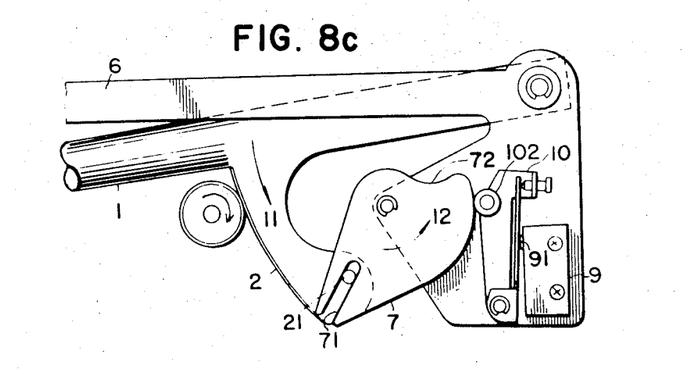

The operation of the alarm mechanism will be described hereunder with reference to FIGS. 8a to 8c. Setting of an alarming point at which an alarm is to be provided is performed by manually moving lever 6 in a clockwise or counterclockwise direction to align the pointer on the outer end of lever 6 with the desired value on the scale. Assuming that an alarming point has been set and that the arm 1 is positioned in a range smaller than the set point (indicated by an arrow 11' in FIG. 8a) the relationship between plate cam 7 and roller 102 is such that the roller 102 is at the low portion 72 of plate cam 7 and hence operating lever 10 is held spaced from operating member 91 of microswitch 9. As a result microswitch 9 is not operated and hence in its closed or opened state. As the arm 1 is displaced in the direction of arrow 11 with the increase in the measured value, plate cam 7 will be rotated in the counterclockwise direction by the engagement of pin 21 and plate cam 7. As plate cam 7 is rotated further in the counterclockwise direction roller 102 rides up on the high portion of the cam to rotate arm 10 against microswitch 9. When arm 1 is rotated to the alarming point as shown in FIG. 8b the arm 10 will be pushed by the high portion of plate cam 7 to operate microswitch 9 to open or close it. This generates an alarm signal. As the arm 1 is further rotated beyond the alarm point the roller is still urged by the high portion of the plate cam to continue the generation of the alarm signal.

In this manner, microswitch 9 for generating the alarm signal, lever 10 for driving the microswitch, and plate cam 7 for actuating lever 10 are mounted in the same plane on movable plate 61 which is integral with lever 6 for setting the alarm point so that the construction of the alarm mechanism is extremely simple and yet it has all functions required.

Figure 9:
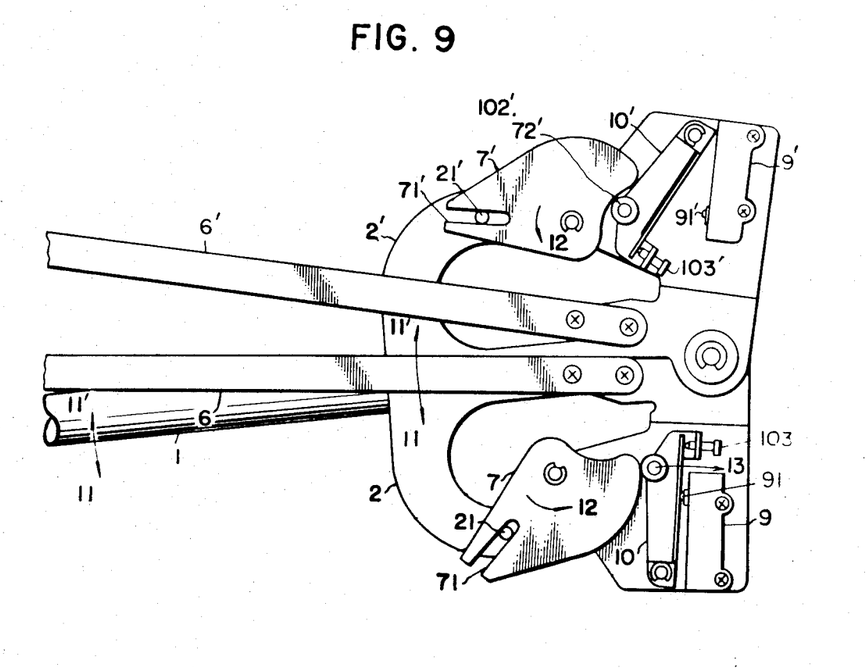
FIG. 9 is a plan view of upper and lower limit alarm mechanisms.
Figure 10:
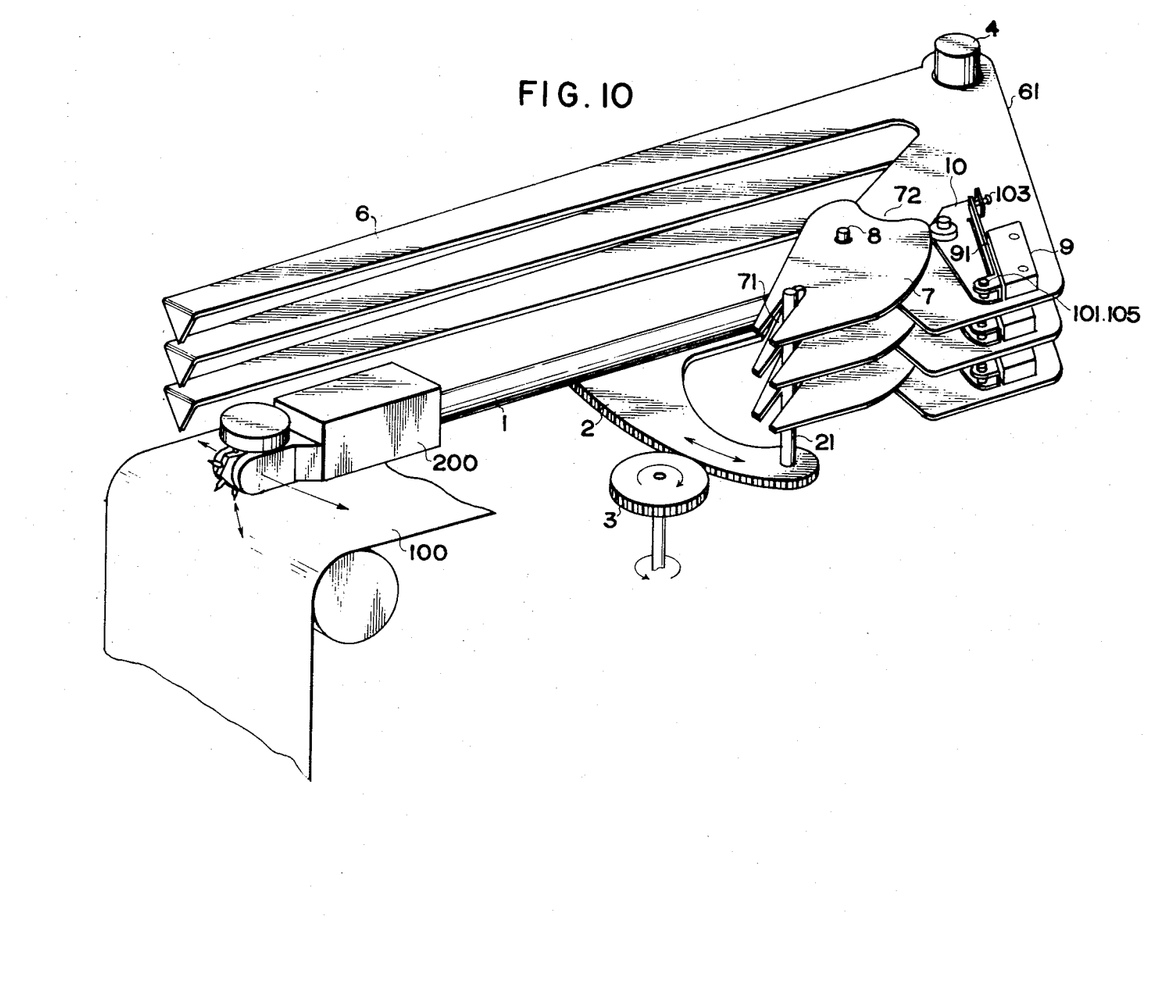
FIG. 10 shows a perspective view of a modified recorder employing a multi-stage alarm mechanism.

Although in the above described embodiment only one alarm mechanism has been shown, if required any desired number of the alarm mechanism may be used. FIG. 9 shows an example of utilizing two symmetrical alarm mechanisms to generate alarm signal at upper and lower limits. In FIG. 9 component parts of the upper limit alarm mechanism are designated by the same reference numerals as those already described and those of the lower limit alarm mechanism are given corresponding primed reference numerals. Upper and lower limit alarm mechanisms are driven respectively by pins 21 and 21' driven in unison with arm 1.

Where it is desired to simultaneously produce a plurality of alarm signals, required number of alarm mechanisms of the same construction may be stacked one upon the other to be operated by the same pin 21 as shown in FIG. 10. As above described, since the microswitch, its operating members and the plate cam are together in the same plane mounted on the movable plate it is quite easy to stack a plurality of such alarm mechanisms.

Although the invention has been shown and described in terms of particular embodiments thereof it will be clear that many changes and modifications will occur to one skilled in the art without departing from the true spirit and scope of the invention as defined in the appended claims.

What is claimed is

1. An intermittent recorder comprising driving means responsive to a measured quantity, a pivotable rotary arm driven by said driving means in accordance with said measured quantity, an intermittent recording mechanism mounted on one end of said arm, a driving shaft extending along said arm to drive said intermittent recording mechanism and means to rotate intermittently said driving shaft, said intermittent recording mechanism comprising a supporting frame fixed to said one end of said arm, a first shaft mounted on said supporting frame, a swinging frame rotatably mounted on said first shaft, a plurality of recording pens mounted on said swinging frame, means to transmit the rotation of said driving shaft to sequentially position said recording pens for recording at each revolution of said driving shaft, said rotation transmitting means comprising a first pin rotatably mounted on and spaced from said first shaft, means for rotating said first pin about said first shaft for each revolution of said driving shaft, a first Geneva gear rotatably mounted on said swinging frame and having a plurality of inwardly extending slots which are spaced around the periphery of said gear, said slots being adapted to be sequentially engaged by said first pin at each rotation of said pin to intermittently rotate said gear, and means to transmit the intermittent rotation of said gear to said plurality of pens, and said recorder further comprising means to reciprocate said swinging frame about said first shaft at each revolution of said driving shaft.

2. The intermittent recorder according to claim 1 wherein said reciprocating means comprises a second shaft rotatably mounted on said supporting frame and adapted to be rotated in response to each revolution of said driving shaft, and a cam mounted on said second shaft and adapted to engage said swing frame, and wherein said means for rotating said first pin about said first shaft comprises a first gear mounted on said second shaft and a second gear adapted to mesh with said first gear and connected to said first pin.

3. The intermittent recorder according to claim 1 which further comprises an alarm point setting mechanism including an alarm point set lever having a rotary shaft coaxial with the pivot of said arm, a movable plate mounted on said alarm point set lever, a switch element mounted on said movable plate, operating means for said switch element, said operating means including a cam rotatably mounted on said movable plate, and means for rotating said cam in accordance with the deflection of said arm.

4. The intermittent recording meter according to claim 1 which further comprises a first alarm point set mechanism including a first alarm point set lever having a rotary shaft coaxial with the pivot of said arm, a first movable plate mounted on said lever, a first switch element mounted on said first movable plate, operating means for said first switch element, said operating means including a first cam rotatably mounted on said first movable plate and means for rotating said first cam according to the deflection of said arm; and a second alarm point set mechanism including a second alarm point set lever having a rotary shaft coaxial with the pivot of said arm, a second movable plate secured to said second alarm point set lever, a second switch element mounted on said second movable plate, second switch element operating means including a second cam rotatably mounted on said second movable plate, and means for rotating said second cam according to the deflection of said arm; said first alarm point set mechanism setting an upper limit alarm point of the deflection for said arm and said second alarm point set mechanism setting a lower alarm point for the deflection of said arm.

5. The intermittent recorder according to claim 1 which comprises a plurality of alarm point set mechanisms, each of said mechanisms including an alarm point set lever having a rotary shaft coaxial with the pivot of said arm, a movable plate secured to said lever, a switch element mounted on said movable plate, switch operating means including a cam rotatably mounted on said movable plate, and means for rotating said cam according to the displacement of said arm, whereby a plurality of alarm points for the displacement of said arm may be set.

6. The intermittent recorder according to claim 1 and further including an ink container mounted on said supporting frame, said container having a plurality of separate compartments of the same number as said pens and being movable to sequentially present said compartments to said pens, a second pin rotatably mounted on and spaced from said first shaft, means for rotating said second pin about said first shaft for each revolution of said driving shaft, a second Geneva gear rotatably mounted on said supporting frame and having a plurality of inwardly extending slots which are spaced around the periphery of said gear, said slots being adapted to be sequentially engaged by said second pin at each rotation of said pin to intermittently rotate said gear, and means to transmit the rotation of said second geneva gear to intermittently move said ink container to sequentially present said separate ink compartments to said pens.

7. An intermittent recorder comprising driving means responsive to a measured quantity, a pivotable rotary arm driven by said driving means in accordance with said measured quantity, an intermittent recording mechanism mounted on one end of said arm, a driving shaft extending along said arm to drive said intermittent recording mechanism and means to rotate intermittently said driving shaft, said intermittent recording mechanism comprising a supporting frame fixed to said one end of said arm, a first shaft mounted on said supporting frame, a swinging frame rotatably mounted on said first shaft, a plurality of recording pens mounted on said swinging frame, means to transmit the rotation of said driving shaft to sequentially position said recording pens for recording at each revolution of said driving shaft, means to reciprocate said swinging frame about said first shaft at each revolution of said driving shaft, and an alarm point set mechanism comprising an alarm point set lever, a movable plate mounted on said alarm point set lever, a switch element mounted on said movable plate, operating means for said switch element, said operating means including a cam rotatably mounted on said movable plate, and means for rotating said cam in accordance with the deflection of said arm.

* * * * *